Patented Aug. 30, 1949

2,480,295

UNITED STATES PATENT OFFICE 2,480,295

ADHESIVE COMPOSITIONS

Robert E. Kent, Arlington, and Alfred Stockfleth, North Arlington, N. J., assignors to E. I. du Pont de Nemours & Company, Wilmington, Del., a corporation of Delaware No Drawing. Application February 9, 1946, Serial No. 646,704

4 Claims. (Cl. 260—28.5)

1

This invention relates to adhesive compositions, products formed therewith and the process of forming said porducts. More particularly, this invention relates to modified polythene adhesive compositions adapted to form strong bonds with other materials, the products formed therewith and the process of forming said products.

An object of this invention is to provide new and improved adhesive compositions. Another object is to provide a modified polythene composition having excellent adhesive properties. A further object is to provide highly adhesive bonds, laminations, cements and coatings. A still further object is to provide a process for producing laminated articles securely bonded together with modified polythene adhesive compositions. Other objects will be apparent from the description of the invention given hereinafter.

The above objects are accomplished according to the present invention by intimately admixing ammonium sulfamate with polythene, placing the resulting adhesive composition between two laminae, e. g. glass or metal, and heating the assembly at a temperature of 130° C.–220° C. under a pressure of 0–2000 lb./sq. in. to bond said laminae to said adhesive composition. More specifically, the adhesive composition preferably will comprise, by weight thereof, 90%–99.5% polythene and 10%–0.5% ammonium sulfamate.

It has also been discovered that by intimately admixing ammonium sulfamate and chlorinated paraffin with polythene a highly satisfactory adhesive is obtained which, in some applications, produces a higher degree of adhesion than the ammonium sulfamate and polythene adhesive. Usually the chlorinated paraffin will comprise about 80 per cent chlorine. When this admixture is employed, generally the resulting adhesive composition will comprise, by weight thereof, 90%–99% polythene, 5%–0.5% ammonium sulfamate and 5%–0.5% chlorinated paraffin. Accordingly, the adhesive of the present invention is composed of an intimate admixture which always comprises, by weight thereof, at least 90% of polythene and at least 0.5% of ammonium sulfamate or sulfamic acid which latter, it has been discovered, may be used in place of the ammonium sulfamate.

The ammonium sulfamate and chlorinated paraffin modifiers may be admixed with the polythene by any suitable conventional method, e. g. by blending on heated rolls or in a Banbury mixer.

By polythene as used herein is meant the normally solid polymers of ethylene, as described and prepared according to Fawcett et al. U. S. Patent 2,153,553.

2

The following examples, in which the proportions are by weight unless otherwise stated, illustrate specific embodiments of the present invention.

Example I

A composition consisting of 90% polythene and 10% ammonium sulfamate was colloided in a heated Banbury mixer and then reduced to a powder in a Ball and Jewell cutter. The powder was placed between two steel plates and heated at 160° C. for five minutes under a pressure of 2000 lb./sq. in. The said composition adhered well to the steel plates.

Example II

A composition consisting of 90% polythene, 5% chlorinated paraffin (80% chlorine) and 5% ammonium sulfamate was blended on heated rolls at 150° C. until the composition was a uniform mixture. The composition then was pulverized in a Ball and Jewell cutter. The resulting particles were placed between two steel plates and the assembly heated at 160° C. for five minutes under a pressure of 2000 lb./sq. in. A strong bond was formed between the said composition and the steel plates.

Example III

A composition identical with that made according to Example II was pulverized to a fine powder. This powder was sprinkled on a brass plate, which was placed in an oven and heated at 160° C. for thirty minutes without application of pressure. The adhesion of the composition coating to the metal surface was so great that the coating could not be removed without cold drawing or tearing the coating.

Example IV

A composition consisting of 99% polythene, 0.5% chlorinated paraffin (80% chlorine) and 0.5% ammonium sulfamate was prepared as in Example II and reduced to a molding powder, which was placed between two steel plates. The plates then were heated at 140° C. for fifteen minutes under a pressure of 22 lb./sq. in. An excellent seal was produced between the said composition and the steel plates.

Example V

A gasket having a square cross section (approximately ¼ in. on an edge) was cut from a sheet of a composition identical with that disclosed in Example II. This gasket was sandwiched between two pieces of glass having the same external dimensions. The resulting assembly was placed in an oven and heated at 150° C. for twenty minutes without application of pressure. The assembly was removed and cooled. An effective seal between the gasket and the glass thus was produced.

It will be understood that the above examples are illustrative only and that the invention broadly comprises intimately admixing ammonium sulfamate with polythene or ammonium sulfamate and chlorinated paraffin with polythene, placing the resulting adhesive composition between two laminae, e. g. glass or metal, and heating the assembly at a temperature of 130° C.–220° C. under a pressure of 0–2000 lb./sq. in. to bond said laminae to said adhesive compositions.

Depending upon the particular application, the adhesive compositions may be in the form of a molding powder, cement, dust, sheet, tape and the like. The adhesive compositions may be applied to the surfaces to be joined by powder spraying, welding, laminating and other suitable methods.

The adhesive strengths of the compositions of the instant invention are substantially equal to the tensile strength of unmodified polythene. That is to say, in greatly improving the adhesive strength of polythene according to the present invention its mechanical properties have been substantially unimpaired and the bonds formed by said adhesive compositions are substantially as strong as the unmodified polythene itself.

Although, for the sake of clarity and simplicity, the present invention has been described with reference to admixing ammonium sulfamate with polythene or ammonium sulfamate and chlorinated paraffin with polythene and heating the resulting adhesive composition between two laminae of glass or metal with or without the application of pressure to bond said laminae to said adhesive composition, the invention is not limited thereto as the adhesive composition may be used to bond laminae of widely assorted materials.

It has been discovered that sulfamic acid may be used instead of ammonium sulfamate and that chlorinated polythene (usually comprising about 60 percent chlorine) may be used instead of chlorinated paraffin and in approximately the same proportions.

It is evident that three laminae are not essential to practice this invention; i. e., the adhesive compositions may be bonded to another single material. Furthermore several layers of materials may be laminated into a unit; i. e., glass, adhesive composition, polythene, adhesive composition and glass may be securely bonded together in the order named to form a laminated unit.

The invention is applicable to forming a laminated product comprising two laminae bonded to an interlayer of the adhesive composition. Materials, other than glass and metal, to which the invention is applicable comprise ceramicware, wood, plastics and fiber.

As many apparently widely different embodiments of this invention may be made without departing from the spirit and scope thereof, it is to be understood that the invention is not limited to the specific embodiments thereof except as defined in the appended claims.

We claim:

1. An adhesive composition composed of an intimate admixture consisting, by weight thereof, of 90%–99.5% solid polythene and 10%–0.5% ammonium sulfamate.

2. An adhesive composition composed of an intimate admixture consisting, by weight thereof, of 90%–99% solid polythene, 5%–0.5% ammonium sulfamate, and 5%–0.5% chlorinated paraffin, said chlorinated paraffin comprising about 80% chlorine.

3. An adhesive composition composed of an intimate admixture comprising, by weight thereof, at least 90% solid polythene and at least 0.5% of a compound from the group consisting of ammonium sulfamate and sulfamic acid.

4. An adhesive composition composed of an intimate admixture comprising, by weight thereof, at least 90% solid polythene and at least 0.5% ammonium sulfamate.

ROBERT E. KENT.
ALFRED STOCKFLETH.

REFERENCES CITED

The following references are of record in the file of this patent:

UNITED STATES PATENTS

| Number | Name | Date |
|---|---|---|
| 2,153,553 | Fawcett | Apr. 11, 1939 |
| 2,237,344 | Evans | Apr. 8, 1941 |
| 2,238,681 | Donough | Apr. 15, 1941 |
| 2,398,361 | Daniels | Apr. 16, 1946 |

OTHER REFERENCES

Hahn et al. Ind. & Eng. Chem. 37, June 1945, pp. 526–32.